Figure 1:
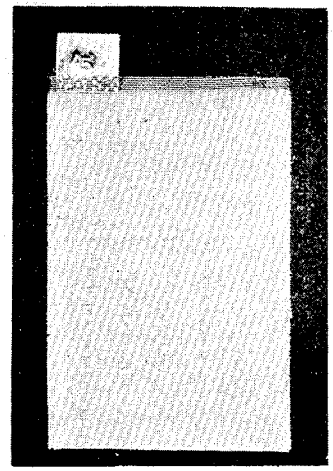

United States Patent

[11] 3,607,437

| [72] | Inventors | Shigekazu Minagawa<br>Tokyo;<br>Hideo Takahashi, Higashimurayama-shi;<br>Kenzo Ito, Hachioji-shi; Tetsuo Gejyo,<br>Tokyo; Yoshiyuki Maki, Fujisawa-shi, all of<br>Japan |
|---|---|---|
| [21] | Appl. No. | 806,253 |
| [22] | Filed | Mar. 11, 1969 |
| [45] | Patented | Sept. 21, 1971 |
| [73] | Assignee | Hitachi, Ltd.<br>Tokyo, Japan |
| [32] | Priority | Mar. 15, 1968 |
| [33] | | Japan |
| [31] | | 43/16488 |

[54] ELECTROLYTE FOR USE IN ALKALINE STORAGE BATTERIES HAVING A ZINC NEGATIVE ELECTRODE
6 Claims, 2 Drawing Figs.

[52] U.S. Cl................................................ 136/154, 136/30

[51] Int. Cl.................................................... H01m 41/02
[50] Field of Search.......................................... 136/154, 155, 30, 6; 204/120

[56] References Cited
UNITED STATES PATENTS

| 2,018,563 | 10/1935 | Martus et al................ | 136/154 X |
| 2,422,045 | 6/1947 | Ruben......................... | 136/137 UX |
| 2,994,625 | 8/1961 | Mendelsohn et al.......... | 136/154 |
| 3,311,501 | 3/1967 | Ruetschi..................... | 136/154 X |
| 3,485,673 | 12/1969 | Jost............................ | 136/154 X |

*Primary Examiner*—Donald L. Walton
*Attorney*—Craig, Antonelli, Stewart & Hill

ABSTRACT: An electrolyte most suitable for use in alkaline storage batteries having a zinc negative electrode, which consists of an aqueous solution of alkali metal hydroxide with zinc or a zinc compound and a small quantity of a stannous compound dissolved therein, and which is capable of preventing the growth of zinc dendrites during charging of the batteries.

3,607,437

ELECTROLYTE FOR USE IN ALKALINE STORAGE BATTERIES HAVING A ZINC NEGATIVE ELECTRODE

This invention relates to improvements in electrolytes for use in alkaline storage batteries having a zinc negative electrode.

Batteries of the type specified above are generally called alkaline zinc storage battery in the light of the fact that the negative electrode has zinc as its active material. The positive electrode of the batteries has nickel hydroxide or air as its active material. The electrolyte used is the so-called aqueous alkali metal hydroxide solution consisting mainly, for example, of potassium hydroxide or sodium hydroxide, with zinc or a zinc compound dissolved therein.

Such alkaline zinc storage battery is advantageous over a lead storage battery in that it is light in weight and in that electric power (watt hour) per unit weight of the battery is large owing to the excellent electrochemical performance, but, on the other hand, this type of battery is very difficult to charge. Therefore, while the alkaline zinc storage battery as such has been known for a long time, such an alkaline zinc storage battery which has characteristics sufficient for practical use of the battery has not yet been developed.

Speaking in more detail, in the alkaline zinc storage battery zinc is dissolved in the electrolyte from the negative electrode during discharge of the battery and deposits again on the negative electrode incident to charging of the battery, forming a dendrite on said negative electrode. The growth of zinc dendrites during charging of the alkaline zinc storage battery causes the volume of the zinc negative electrode to be abnormally expanded and thus shorting between the negative and positive electrodes tends to occur. Further, the state of the deposited zinc is so instable that even a slight vibration of the battery will result in breakaway of the deposited zinc from the negative electrode. Namely, dendrite growth is responsible for early failure of the battery because of shorting, loss of capacity due to breakaway of active material from the negative electrode and, therefore, fluctuation of performance and limited cycle life, and thus makes the battery unserviceable for practical applications.

In the past, attempts were made to prevent the growth of dendrite, during charging of the storage battery, by causing the electrolyte to flow at a high speed between the negative and positive electrodes or by adding a soluble cyanide to the electrolyte, but neither of these methods have proved satisfactory for rendering the storage battery serviceable.

It is, therefore, the object of the present invention to provide an electrolyte with which the growth of zinc dendrite can be prevented and a uniform, dense zinc electrode having a metallic gloss can be obtained during charging of the alkaline zinc storage battery, and which, therefore, enables the storage battery to be used for practical applications.

Namely, according to the present invention there is provided an electrolyte consisting of an aqueous alkali metal hydroxide solution with a zinc ion and 0.001 to 1 percent by weight, preferably 0.005 to 0.05 percent by weight, of a soluble stannous compound with respect to the solution.

Addition of the stannous compound brings about an appreciable effect no matter how small the amount may be. In general, however, when the amount is not larger than 0.001 percent or not smaller than 1 percent, only 60 percent of the total area of the zinc electrode surface at most can be covered with a dense layer of deposited zinc having a metallic gloss, with the remaining 40 percent or more of the area being covered with a dendrite, and an effect sufficient to put the alkaline zinc storage battery in practical use cannot be obtained. On the contrary, 60 percent or more of the zinc electrode surface can be covered with a dense layer of zinc deposition having a metallic gloss when the stannous compound is added in an amount ranging from 0.001 to 1 percent, and 97 percent or more of the area in an amount ranging from 0.005 to 0.05 percent, and thereby a practical alkaline zinc storage battery having excellent charging characteristic can be obtained.

The mother solution of the present electrolyte consists of a solution of an alkali metal hydroxide and zinc or a zinc compound soluble in water, which is well known in the art and a solution composed of 20 to 50 grams of alkali metal hydroxide and 50 to 120 grams of zinc or soluble zinc compound per 1 liter of water is a typical example thereof. As the alkali metal hydroxide, potassium hydroxide is commonly used, but sodium hydroxide and lithium hydroxide may also be used. As soluble zinc compound, it is common to use zinc oxide but any other zinc compound soluble in alkali solution may also be used. Instead of dissolving such zinc compound, zinc may be caused to be present in the mother solution by electrolyzing metallic zinc.

Stannous compounds to be added to the mother solution include, for example, stannous chloride $SnCl_2 \cdot 2H_2O$ and stannous hydroxide $Sn(OH)_2$, but are not restricted to those mentioned and any other stannous compound may also be used insofar as it is soluble in alkali solution. Stannous chloride is particularly suitably used. The same effect as that attained by the stannous compound dissolved in the mother solution may, of course, be obtained by disposing a subsidiary electrode of metallic tin in the container and subjecting said electrode to electrolysis, only during charging of the battery, whereby said electrode is dissolved in the electrolyte in the form of divalent tin ion.

In this type of storage battery, as stated previously, the zinc negative electrode is dissolved away in the electrolyte incident to discharge of the battery. Therefore, the negative electrode is usually to be composed of a substrate consisting of an alkali-resistant metal plate or wire gauze, for example, of iron or nickel, and a zinc coating formed on the surface of said substrate by electrodeposition. In this view, the aforesaid substrate having zinc previously deposited thereon by electrodeposition is used as negative electrode. Alternatively, such a substrate may be used as such but in this case the electrolyte used should have zinc dissolved therein so that the zinc may be deposited on the substrate by electrodeposition during charging of the battery.

Figure 2:
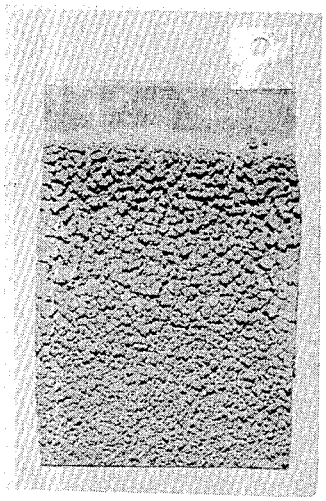

Many other features and advantages, and other objects of the present invention will be apparent from the following detailed description taken in conjunction with the accompanying drawings, in which:

FIG. 1 is a photographic picture showing the surface of a zinc negative electrode after a storage battery comprising said zinc negative electrode has been charged, with 0.01 percent by weight of stannous chloride added to the electrolyte therein as stannous compound according to the present invention, and FIG. 2 is a photographic picture showing the surface of the same zinc negative electrode after a storage battery comprising said zinc negative electrode and the conventional electrolyte, containing no stannous compound, has been charged.

The storage batteries used in the experiment conducted for obtaining the photographic pictures of FIGS. 1 and 2 were of the same construction and charged under exactly the same conditions, with the only exception that the compositions of the electrolytes were different, i.e. one of the electrolytes contained a stannous compound and another one contained no stannous compound. The storage batteries were each produced in the following manner: Namely, an iron wire gauze was used as substrate of the negative electrode. The positive electrode consisted of a sintered porous plate of nickel as substrate which was impregnated with nickel hydroxide as active material. These electrodes were disposed in the battery container with an interval of 4 mm. therebetween. The electrolyte in the storage battery from which the photographic picture of FIG. 1 was obtained was composed of 400 ml. of a mother solution consisting of a mixture of 40 g./l. of KOH and 80 g./l. of ZnO, and 0.01 percent by weight of stannous chloride $SnCl_2 \cdot 2H_2O$ dissolved in said mother solution, whereas that used in the storage battery from which the photographic picture of FIG. 2 was obtained consisted solely of said mother solution, with no stannous compound dissolved therein. Both storage batteries were charged in the amount of 6AH at a charging current density of 1 A/dm.$^2$.

As will be seen from the photographic pictures, the negative electrode used with the electrolyte of the present invention has zinc deposited thereon in very high density and the meshes of the substrate are visible. However, the negative electrode used with the conventional electrolyte containing no $Sn^{++}$ shows a very coarse spongy deposition, although both storage batteries were charged under the same charging conditions. Namely, while the amounts of zinc deposited on the respective negative electrodes are substantially the same, the state of electrodeposition is entirely different between the electrodes as shown, substantiating clearly the remarkable effect of the $Sn^{++}$ in the electrodeposition of zinc. The reason why the $Sn^{++}$ present in the electrolyte, produces such a remarkable effect in the electrodeposition of zinc is not understood at present but, according to an assumption of the present inventors, this may be explained in such a way that the $Sn^{++}$ present in the vicinity of the zinc negative electrode serves to prevent the absorption speed of the zinc ion from becoming nonuniform at said portion and thereby prevent local electrodeposition of zinc (formation of a spongy electrodeposition), whereby the zinc ion is absorbed at a uniform speed and an electrode having a dense, uniform layer of zinc deposition can be obtained which enables the storage battery to be chargeable and dischargeable.

Table 1 shows the relationship between the amount of stannous compound added to the electrolyte and the state of zinc electrodeposition. A storage battery having the same construction as the one in which the sample electrode of FIG. 1 was used, was used for taking the measurements of table 1. In the table, the term "metal ratio" means the proportion of the amount of electrodeposition having a metallic gloss to the total amount of zinc deposited by charging. In other words, the higher the metal ratio is, the lesser the growth of dendrite and the better the state of electrodeposition is.

According to the experiments conducted by the present inventors, it has been found that the metal ratio must be at least 60 percent for the alkaline zinc storage battery to be put in practical use. From this point of view, it will be understood that the effective amount of stannous compound to be added is from 0.001 to 1 percent by weight, preferably from 0.005 to 0.05 percent by weight. Namely, when a stannous compound is added in an amount of less than 0.001 percent by weight or more than 1 percent by weight, the metal ratio is smaller than 60 percent, whereas a metal ratio of 60 percent or higher can be obtained when the stannous compound is added in an amount of from 0.001 to 1 percent by weight, as specified herein, and particularly a metal ratio of 97 percent or even higher can be obtained by adding the stannous compound in an amount of from 0.005 to 0.05 percent by weight.

TABLE 1

| Additive | Concentration (wt. %) | Current Density (A/dm²) | Amount of Charging Electricity (AH) | Electrode Interval (mm.) | Metal Ratio (%) |
| --- | --- | --- | --- | --- | --- |
| $SnCl_4 \cdot 2H_2O$ | 0.0005 | 2 | 6 | 30 | 40 |
| | 0.001 | 2 | 12 | 30 | 60 |
| | 0.005 | 2 | 12 | 30 | 97 |
| | 0.01 | 2 | 12 | 30 | 98 |
| | 0.05 | 2 | 12 | 30 | 99 |
| | 0.1 | 2 | 12 | 30 | 65 |
| | 1 | 2 | 6 | 30 | 60 |
| | 1.5 | 2 | 6 | 30 | 20 |

Although in the above table, stannous chloride was used as a stannous compound, other stannous compounds may be used to obtain substantially the same effect as those shown in table 1. In case of stannic compounds, however, a metal ratio of 44 percent is the highest which can be obtained, even under optimum conditions, and an alkaline zinc storage battery comprising such electrode cannot be put in practical use.

Table 2 shows the relationship between the electrode distance and charging current density, and the state of zinc electrodeposition. The composition of the storage battery used for obtaining the data of table 2 was as follows:

Positive electrode: Sintered porous plate of nickel impregnated with nickel hydroxide as active material
Negative electrode: Iron wire gauze
Electrolyte: 400 ml. of a mixture of 80 to 100 g./l. of ZnO and 40 g./l. of KOH, with 0.01 weight percent of $SnCl_2 \cdot 2H_2O$ dissolved therein.

TABLE 2

| Current Density (A/dm²) | Electrode Interval (mm.) | Amount of Charging Electricity (AH) | Metal Ratio (%) |
| --- | --- | --- | --- |
| 0.5 | 2 | 12 | 83 |
| 1 | 30 | 6 | 100 |
| 1 | 16 | 6 | 100 |
| 1 | 4 | 6 | 100 |
| 1 | 2 | 6 | 100 |
| 1 | 1 | 6 | 100 |
| 1 | 0.5 | 6 | 97 |
| 2 | 30 | 12 | 99 |
| 2 | 16 | 12 | 98 |
| 2 | 8 | 12 | 100 |
| 2 | 4 | 12 | 100 |
| 2 | 2 | 12 | 98 |

As will be apparent from the above table, according to the present invention a good electrodeposition state can be obtained even when the positive and negative electrodes are located close to each other with an interval in the order of 1 mm. Therefore, it is possible to incorporate the electrodes in close relation in the battery and thereby to make the electric capacity per unit volume large. Further, according to the present invention zinc can be deposited in an amount of from 4 g./dm.² up to 20 g./dm.², as contrasted to the amount of about 1 g./dm.² which has been the largest amount attainable by the conventional technique. Yet further, in the electrodeposition of zinc, formation of dendrite can be prevented by the presence of stannous ion which was added to the electrolyte in a suitable amount, and the layer of zinc deposition thus formed is uniform and dense, and has a metallic gloss. Therefore, breakaway of the zinc from the negative electrode surface and shorting between the negative and positive electrodes caused by a dendritic zinc deposition can be avoided which have been drawbacks of the conventional storage batteries of this type, and a chargeable and dischargeable alkaline zinc storage battery for practical use can be produced.

Although a storage battery comprising the electrolyte of this invention can be used for practical purposes without circulating the electrolyte, it will be obvious that better characteristics can be obtained by circulating the electrolyte in the battery. In the past, zinc batteries of this type using zinc as the active material of the negative electrode have been used solely as primary battery. However, by employing this invention they can satisfactorily be used as secondary battery. The alkaline zinc storage battery, now rendered usable for practical applications by the present invention, is of great industrial value when used as a source of electricity for an electric car, because it is light in weight and large in discharge current capacity.

The present invention will be further illustrated hereunder by way of example:

EXAMPLE 1

80 g. of zinc oxide powder was dissolved in a solution of 40 g. of potassium hydroxide KOH in 1 liter of water to prepare an aqueous alkaline solution (mother solution). Then, stannous chloride $SnCl_2 \cdot 2H_2O$ was added to 400 ml. of the aqueous alkaline solution in an amount of 0.001 percent by weight to form an electrolyte. The electrolyte thus prepared was poured in a battery container. The electrodes used had a surface area of 2 dm.² respectively. An iron plate was used as substrate of the negative electrode, while a sintered nickel body carrying nickel hydroxide as active material was used as the substrate of the positive electrode. These electrodes were disposed in the container in opposed relation at an interval of 20 mm. therebetween. The battery of this type is generally called a nickel-zinc alkaline storage battery. The battery thus produced was charged with a charging current of 2 A. for 6 hours, whereupon a satisfactory, dense layer of zinc deposition having a metallic gloss was formed on the iron plate at a charging efficiency of 80 percent. The term "charging efficiency" as used herein means the rate of the amount of zinc, actually deposited on the negative electrode, to the amount of zinc theoretically deposited by the amount of charging electricity. In contrast thereto, when the stannous compound was not added to the electrolyte, a dendrite was formed only 30 minutes after charging was started and an electrodeposition layer having a metallic gloss could not be obtained.

EXAMPLE 2

A storage battery was produced in the same manner as in example 1, except that the stannous chloride was added to the aqueous alkaline solution in an amount of 0.01 percent by weight and an iron gauze was used as negative electrode, and the storage battery thus produced was charged in the same manner as in example 1. A layer of electrodeposition having a beautiful metallic gloss could be obtained on the negative electrode at a charging efficiency of 100 percent.

EXAMPLE 3

The storage batteries produced in examples 1 and 2 above were charged and then discharged under the discharging conditions of a discharging current of 4 A. and discharge termination voltage of 1.3 v., and a cycle of such charging and discharging operations was repeated 10 times. The electrodeposition was reproduced satisfactorily at each cycle of the charging operation.

EXAMPLE 4

Substantially the same effect as in example 1 was obtained by using stannous hydroxide $Sn(OH)_2$ instead of the stannous chloride used in example 1.

EXAMPLE 5

Substantially the same effect as in example 1 was obtained by using 50 grams of sodium hydroxide instead of the potassium hydroxide used in example 1.

What is claimed is:

1. An electrolyte for use in an alkaline storage battery having a zinc negative electrode, said electrolyte consisting essentially of an aqueous alkali metal hydroxide solution containing zinc ion, with a stannous compound dissolved therein in an amount of 0.001 to 1 percent by weight with respect to the solution.

2. An electrolyte for use in an alkaline storage battery having a zinc negative electrode, said electrolyte consisting essentially of an aqueous alkali metal hydroxide solution containing zinc ion, with a stannous compound dissolved therein in an amount of 0.005 to 0.5 percent by weight with respect to the solution.

3. An electrolyte as defined in claim 1, in which said stannous compound is a compound selected from the group consisting of stannous chloride and stannous hydroxide.

4. An electrolyte as defined in claim 2, in which said stannous compound is a compound selected from the group consisting of stannous chloride and stannous hydroxide.

5. An electrolyte for use in a nickel-zinc alkaline storage battery which prevents dendrite growth, said electrolyte consisting essentially of an aqueous solution having dissolved therein potassium hydroxide at a concentration equivalent to about 20 to about 50 grams per liter, zinc oxide at a concentration equivalent to about 50 to about 120 grams per liter and, in addition a stannous compound at a concentration equivalent to 0.001 to 1 percent by weight with respect to the solution, said stannous compound being selected from the group consisting of stannous chloride and stannous hydroxide.

6. An electrolyte as defined in claim 5, in which the amount of said stannous compound is from 0.005 to 0.05 percent by weight with respect to the solution.